United States Patent [19]

Davis et al.

[11] Patent Number: 5,407,989
[45] Date of Patent: Apr. 18, 1995

[54] GREEN STRENGTH PROMOTERS FOR EPDM/EPM COMPOSITIONS

[75] Inventors: James A. Davis, Indianapolis, Ind.; William F. Barham, Jr., Hope, Ark.; Brian S. Alexander, Sheridan, Ind.

[73] Assignee: Bridgestone/Firestone, Inc., Akron, Ohio

[21] Appl. No.: 208,555

[22] Filed: Mar. 10, 1994

[51] Int. Cl.⁶ ............................................. C08K 3/38
[52] U.S. Cl. ................................... 524/405; 428/147; 428/148; 524/437
[58] Field of Search ................ 524/437, 405, 403; 428/147, 148

[56] References Cited

U.S. PATENT DOCUMENTS

| | | |
|---|---|---|
| 2,422,153 | 6/1947 | Nimwegen . |
| 3,257,346 | 6/1966 | Gruver et al. . |
| 3,370,049 | 2/1968 | Miller et al. . |
| 3,527,740 | 9/1970 | Baker . |
| 3,671,478 | 6/1972 | Doyle et al. . |
| 3,865,763 | 2/1975 | Feniak . |
| 3,911,202 | 10/1975 | Stine ........................ 204/159.11 |
| 3,976,624 | 8/1976 | Inouye et al. . |
| 4,062,693 | 12/1977 | Berger ........................... 106/308 |
| 4,125,509 | 11/1978 | Vostovich ..................... 524/437 |
| 4,147,690 | 4/1979 | Rich ............................. 524/436 |
| 4,283,316 | 8/1981 | Bonsignore ................... 524/437 |
| 4,373,048 | 2/1983 | Schubert et al. ............. 524/437 |
| 4,415,695 | 11/1983 | Sarkar . |
| 4,810,565 | 3/1989 | Wasilus et al. .............. 428/147 |
| 4,987,192 | 2/1991 | Oberster et al. . |
| 5,247,009 | 9/1993 | Kitahara . |

FOREIGN PATENT DOCUMENTS

| | | |
|---|---|---|
| 52-74646 | 6/1977 | Japan . |
| 52-77139 | 6/1977 | Japan . |
| 56-106935 | 8/1981 | Japan . |
| 60-137946 | 7/1985 | Japan . |
| 61-276859 | 12/1986 | Japan . |

OTHER PUBLICATIONS

Kunstoffe (German Plastics) 67 (1977) pp. 34–38—English Translation.
Great Lakes Mineral Co. $Al_2O_3.3H_2O$ brochure (1977).
P. R. Johnson: Rubber Chem. & Tech., vol. 49 pp. 158–169 (1976).
John W. Lyons: The Chemistry & Uses of Fire Retardants, pp. 80–88 (1970).

*Primary Examiner*—Veronica P. Hoke
*Attorney, Agent, or Firm*—Frank J. Troy, Sr.

[57] ABSTRACT

EPM and/or EPDM compositions exhibiting superior green strength as compared to conventional EPM-/EPDM compositions are attained by adding, along with the rubber curing agents and various conventional additives as desired, colemanite and/or alumina trihydrate. Colemanite, alumina trihydrate or a mixture of the two have unexpectedly been found to enhance the green strength of EPM/EPDM compositions prior to vulcanization. The green strength promoters of this invention utilized in EPM/EPDM rubber compositions allows for faster mixing (shorter mixing cycles) and improved processing rates, such as faster calender throughput rates, to be achieved.

14 Claims, No Drawings

GREEN STRENGTH PROMOTERS FOR EPDM/EPM COMPOSITIONS

FIELD OF THE INVENTION

The invention relates generally to the field of EPDM and EPM rubber compositions. More particularly the invention pertains to EPDM and EPM rubber composition incorporating mineral fillers for improving the green strength properties of such compositions prior to the vulcanization thereof.

BACKGROUND OF THE INVENTION

Ethylene-propylene copolymers (EPM) and ethylene-propylene-diene terpolymers (EPDM) are extensively utilized in a variety of applications. A particular application wherein EPM and EPDM are preferred because of their excellent physical properties, weathering and heat aging resistance is in rubber sheeting, such as roofing, agricultural pond liners and water distribution membranes. EPM and EPDM sheeting materials usually are prepared by compounding the EPM, EPDM or mixtures thereof with the appropriate fillers, plasticizers, antidegradants, etc. in a suitable internal mixer, and calendering the resulting compound into the desired sheet rubber. In order to achieve good calendering at economically suitable productions rates the EPM/EPDM formulations should possess, among other qualities, a fairly high green strength. Conventional methods of increasing the green strength of EPM/EPDM formulations include utilizing EPM and/or EPDM polymers having a relatively high ethylene content, using EPM and/or EPDM polymers having relatively high molecular weights, and utilizing EPM and/or EPDM polymers having a broad molecular weight distribution. While these methods generally provide EPM and/or EPDM formulations exhibiting some improvement in green strength, they place limits on the types of EPDM and/or EPM polymers which can be used, and consequently place relatively restrictive limits on the desired properties which the sheet material can possess. Moreover, the foregoing methods of improving the green strength of EPM and/or EPDM formulations generally have accompanying disadvantages such as poor low temperature processability, mixing and pigment dispersibility problems, slower cure rates, poor cured physical properties, or combinations thereof.

U.S. Pat. No. 5,247,009 to Kitahara discloses a rubber composition which includes a rubbery polymer which can for example be EPDM and a modified liquid polymer which is obtained by reacting a liquid polymer having at least one carbon-carbon double bond with an organic compound having a group of the formula —CH=N— and with an organic acid halide, in the presence of a Friedel-Crafts catalyst. The patent discloses that the composition exhibits better processability on the calender rolls than the comparative composition containing the rubber alone, and has improved green strength. The Kitahara patent shows modest improvements of green strength for natural rubber, polyisoprene and polybutadiene. However, while Kitahara shows improved strength properties for vulcanized EPDM rubber which has been formulated with the modified liquid polymers, data showing how green strength is affected when the modified liquid polymers are added to EPDM are conspicuously absent. Moreover, the composition has the disadvantage of requiring a modified liquid polymer which must be prepared and separated from a reaction mixture, thereby significantly increasing the steps and expense of preparing a formulation believed to exhibit modest, if any, improvement in green strength.

Various attempts have been made to increase the strength of cured polymeric formulations by adding reinforcing mineral fillers thereto. Such materials have also been added to rubber formulations to increase hardness, green stock viscosity and specific gravity, and to reduce the modulus of the cured compounds. However, it is believed that these mineral fillers have not been used nor are they known for improving the green strength and processability, particularly during Banbury mixing and the calendering of rubber formulations prior to vulcanization.

U.S. Pat. No. 2,422,153 to Van Nimwegan et al. discloses the use of various reactive materials for improving the strength of cured rubber articles. Examples of such reactive materials include boric oxide, vanadium oxide, boraluminates, borates, phosphates, sulfates, nitrates and halides. The Van Nimwegan et al. patent, however, does not disclose materials which are expected to improve green strength to facilitate increased processing rates.

U.S. Pat. No. 3,976,624 to Inouye et al. discloses the use of metal borates, including calcium borate, to improve adhesion between a rubber composition and a metal surface which has been coated with the rubber composition. The Inouye et al. patent relates primarily to SBR and other rubber compositions which are used to form tire components that are bonded to metal cords or the like, and does not suggest the use of borates in EPM, EPDM, or in any rubber formulation which is not intended or required to be bonded to metal substrates.

Thus, while minor improvements in green strength can be achieved utilizing specific EPM or EPDM polymers which generally adversely affect other desirable properties, and while improvements in the strength of cured rubber compositions can be achieved by utilizing various reinforcing fillers or reactive materials, there still exists a need for an effective, inexpensive green strength promoter for EPDM and/or EPM compositions, especially if the EPDM and/or EPM is an amorphous (non-crystalline) polymer.

SUMMARY OF THE INVENTION

In accordance with the present invention, EPDM, EPM, or other similar olefinic type copolymer formulations including butyl, neoprene, chlorosulfonated polyethylene, chlorinated polyethylene and mixtures thereof which exhibit improved green strength and, hence, improved processability, particularly improved calenderability, are provided. Specifically, it has been unexpectedly discovered that the green strength of EPDM and/or EPM formulations can be significantly increased without imparting any significant deleterious effect on other desired properties by adding minor amounts of alumina trihydrate, colemanite (the ore of calcium borate; $Ca_2B_6O_{11} \cdot 5H_2O$), or a mixture of both to the EPDM formulation.

The use of alumina trihydrate, colemanite, or both as green strength promoters for EPM and/or EPDM formulations allows for higher processing and manufacturing rates. In particular, the EPM/EPDM compositions of the invention allow for faster mixing times and increased calender throughput rates thereby permitting higher production rates and lower manufacturing costs. More generally, the compositions of the invention can be utilized advantageously in substantially any application wherein EPM/EPDM compositions having improved green strength properties are desired. For instance, the formulations disclosed herein can be used advantageously in certain extrusion processes where higher green strength is desired such as to achieve faster extruder throughput rates, especially when extruding EPM/EPDM compositions at elevated temperatures.

DETAILED DESCRIPTION OF THE PREFERRED EMBODIMENTS

The designation EPM as used herein refers to copolymers of ethylene and propylene, and the designation EPDM refers to terpolymers of ethylene, propylene and a diene. These designations are consistent with the nomenclature convention endorsed by the American Society for Testing Materials (ASTM).

The invention is not limited to any particular types of EPM or EPDM polymers, and can be applied to generally any of the commercially available EPM copolymers and EPDM terpolymers, regardless of ethylene content, diene type and content, molecular weights, molecular weight distributions, etc. Preferred EPM and EPDM polymers generally include those having an ethylene content of from about 45 to about 70 percent by weight. The EPDM terpolymers preferably have a diene content of from about 1 to about 10 percent by weight. The preferred EPM/EPDM polymers for use with the invention generally have molecular weights characterized by a Mooney viscosity of from about 20 to about 70 at 125° C. Suitable EPM and EPDM polymers which can be used in the practice of this invention have a molecular weight distribution characterized by a polydispersity (the ratio of the weight average molecular weight to the number average molecular weight) of from about 1 to about 5.

The diene monomer used to form the EPDM terpolymers which can be used in the practice of this invention is preferably a non-conjugated diene. Illustrative examples of non-conjugated dienes which can be used to form EPDM terpolymers suitable for use with the invention include dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like, with dicyclopentadiene, ethylidene norbornene and 1,4-hexadiene being preferred.

The green strength of generally any EPM rubber, EPDM rubber, or combination thereof, whether obtained commercially or specially synthesized utilizing any of the methods known to the art and literature, can be improved by adding a suitable amount of alumina trihydrate, colemanite or combinations of both thereto.

Methods for preparing EPM and EPDM rubbers are well known to the art. Illustrative methods can be found, for example, in U.S. Pat. No. 3,280,082; "Rubber Chemistry & Technology," Vol. 45, No. 1, March, 1972, Division of Rubber Chemistry, *Rubber Technology*, 2nd Edition, Morton, Van Nostrand Reinhold Company, New York, 1973, chapter 9; *Polymer Chemistry of Synthetic Elastomers*, Part II, High Polymers Series, Volume 23, John Wiley & Sons, Inc., New York, 1969, chapter 7; *Encyclopedia of Polymer Science and Technology*, Interscience Publishers, a Division of John Wiley & Sons, Inc., New York, Volume 6, (1967), pgs. 367–8 and volume 5 (1966), pg. 494; and *Synthetic Rubber Manual*, International Institute of Synthetic Rubber Producers, Inc., 8th Edt., 1980.

Throughout the specification, the amounts of green strength promoters, fillers, tackifiers, plasticizers, processing aids, curing agents and any other additives will generally be expressed as parts by weight per 100 parts by weight of EPM and/or EPDM rubber contained in the specification and will be designated "phr".

The compositions of the invention, in addition to including at least one EPM or EPDM rubber, includes aluminum trihydrate, colemanite or a combination of both as green strength promoters. Generally, even small amounts of the green strength promoters of this invention will provide an incremental improvement in the green strength of the EPM/EPDM compositions to which they are added. However, to achieve a significant improvement (i.e., one that provides an observable, reproducible benefit such as consistent improvement in calender throughput) it is generally necessary to utilize at least about 5 parts by weight of the green strength promoter (alumina trihydrate, colemanite or a combination of both) per 100 parts by weight of EPM and/or EPDM rubber. Desirably, the green strength promoters of this invention are generally utilized in amounts ranging from about 10 to 150 phr, and more preferably from about 10 to 85 phr.

Alumina trihydrate is a finely divided, odorless, crystalline, white powder having the chemical formula $Al_2O_3 \cdot 3H_2O$. Alumina trihydrate when used as a green strength promoter for EPM and EPDM in accordance with the invention preferably has an average particle size ranging from about 0.1 micron to about 5.0 microns, and more preferably from about 0.5 to about 2.5 microns. A preferred ground alumina trihydrate for use with the invention is designated H-15, and has a specific gravity of about 2.42, and an ash content of about 64–65 weight percent. ATH-15 is commercially available from Franklin Industrial Minerals, 821 Tilton Bridge Road, Dalton, Ga. Other alumina trihydrates produced by Franklin Industrial Minerals which are believed to have utility in this invention include those designated H-100, H-105, H-109 and H-990. Alumina trihydrate can also be used as a flame retardant and smoke suppressant in EPDM roof sheeting.

Other sources of alumina trihydrate are Micral 1000 and Micral 1500, which have a median particle size 1.1 and 1.5 microns, respectively. Both alumina trihydrates have a specific gravity of about 2.42, an ash content of 64–65 weight percent and a loss of ignition at 1000° F. of about 34.65 percent by weight. Micral 1000 and Micral 1500 are commercially available from J. M. Huber Corporation, Solem Division, 4940 Peachtree Industrial Blvd., Norcross, Ga. 30071. Other alumina trihydrates produced by Solem Division/J. M. Huber Corporation which are believed to have utility in this invention included those designated Micral 932 and Micral 532 as well as superfine alumina trihydrates including SB-632 and SB-805.

Colemanite is the ore of calcium borate. It has the chemical formula $Ca_2B_6O_{11} \cdot 5H_2O$, and a specific gravity of about 2.40. Colemanite used as a green strength promoter in accordance with the principles of this invention preferably has an average particle size of from about 0.1 to about 5.0 microns, and more preferably from about 0.5 to about 2.5 microns. Different particle size grades of colemanite are commercially available from American Borate Company, Virginia Beach, Va.

The composition or compound employed to form the roof sheeting material comprises 100 parts by weight of EPDM, EPM, or other similar olefinic type copolymers, including butyl, neoprene, chlorosulfonated polyethylene, chlorinated polyethylene and mixtures thereof, to which are added mineral fillers as total or partial replacements for traditionally used black fillers, and processing materials as well as optionally other components, all of which are discussed hereinbelow.

With respect first to the non-black mineral fillers, suitable fillers are selected from the group comprising of hard clays, soft clays, chemically modified clays, mica, talc, alumina trihydrates, calcium carbonate, titanium dioxide, amorphous precipitated hydrated silica and mixtures thereof. These fillers may, either partially or completely replace conventional "black" type fillers, i.e. carbon black and other related petroleum-derived materials.

Some four basic types of clays are normally used as reinforcing fillers for rubber elastomers. The different types of clay fillers include; airfloated, water washed, calcined and surface treated or chemically modified.

The airfloated clays are the least expensive and most widely used. They are divided into two general groups, hard and soft, and offer a wide range of reinforcement and loading possibilities. Hard Clays are used in the amount of about 20 parts to about 175 parts per 100 parts of polymer(phr), preferably in an amount from about 65 to 125 phr. The preferred range of hard clays (65 to 125) is about equal to the amount of carbon black normally used in preparing a sulfur cured EPDM roof membrane. Any commercially available hard clay may be used. The preferred airfloated hard clays used are Suprex®, Barden R®; LGB® all commercially available from J. M. Huber Corporation.

The airfloated soft clays are used in the amount of about 20 parts to about 175 parts per 100 parts of polymer(phr), preferably in an amount from about 65 to 125 phr. The preferred range of soft clays (65 to 125 phr) is also about equal to the amount of carbon black normally used in preparing sulfur cured EPDM roof sheeting. The preferred airfloated soft clays used are Paragon® and K-78®, all commercially available from J. M. Huber Corporation and HiWhite R® Clay commercially available from Evans Clay Company, Cartersville, Ga.

Water washed clays are normally considered as semi-reinforcing fillers. This particular class of clays is more closely controlled for particle size by the water-fractionation process. This process permits the production of clays within controlled particle size ranges. The preferred ranges of water washed clays are very similar to the preferred amounts of airfloated soft clays mentioned hereinabove. Some of the preferred water washed clays include Polyfil®DL, Polyfil®F, Polyfil®FB, Polyfil®HG-90, Polyfil®K and Polyfil®XB, all are commercially available from J. M. Huber Corporation.

The third type of clay includes the calcined clay. Clays normally contain approximately 14 percent by weight water of hydration, and most of this can be removed by calcination. The amount of bound water removed determines the degree of calcination. The preferred ranges of calcined clays are very similar to the preferred ranges of airfloated hard clays mentioned hereinabove. Some of the preferred calcined clays include Polyfil®40, Polyfil®70, and Polyfil®80, all commercially available from J. M. Huber Corporation.

The final type of clay includes the chemically modified reinforcing clays. Crosslinking ability is imparted to the clay by modifying the surface of the individual particles with a polyfunctional silane coupling agent. Chemically modified clays are used in the amount of about 20 parts to about 175 parts per 100 parts of polymer(phr), preferably in an amount from about 65 to 125 phr. The preferred range of chemically modified clays (65 to 125 phr) is about equal to the amount of carbon black normally used in preparing sulfur cured EPDM roof sheeting. Normally the specific gravity of most clays is about 2.60 at 25° C. The preferred chemically modified clays are commercially available from J. M. Huber Corporation and include: Nucap® 100, Nucap® 190, Nucap® 200, Nucap® 290, Nulok® 321, Nulok® 390 and Polyfil® 368.

Other useful non-black fillers include amorphous silica (silicon dioxide). Silicas are generally classed as wet-process, hydrated silicas because they are produced by a chemical reaction in water, from which they are precipitated as ultrafine, spherical particles. Silica can be employed in the amount of about 20 parts to about 100 parts per 100 parts of polymer(phr), preferably in an amount from about 20 to 50 phr. The useful upper range is limited by the high viscosity imparted by fillers of this type. The preferred range of silica (20 to 50 phr) is about equal to half the amount of carbon black normally used in preparing sulfur cured EPDM roof sheeting. Some of the commercially available silicas which may be used include: Hi-Sil® 215, Hi-Sil® 233, Hi-Sil® EP and Silene® D all produced by PPG Industries. Also, a number of useful commercial grades of different silicas and silicates are available from J. M. Huber Corporation.

Finely ground calcium carbonate is employed in the amount of about 20 parts to about 175 parts per 100 parts of polymer(phr), preferably in an amount from about 35 to 100 phr. The preferred range of finely ground, high brightness calcium carbonate (35 to 100 phr) is about equal to half the amount of carbon black normally used in preparing sulfur cured EPDM roof sheeting. Calcium carbonate generally has a specific gravity of about 2.71 and is commercially available from a number of suppliers including Harwick Chemical, J. M. Huber Corporation, Georgia Marble, Genstar Stone Products and Omya, Inc.

Titanium dioxide is employed in the amount of about 5 parts to about 80 parts per 100 parts of polymer(phr), preferably in an amount from about 10 to 60 phr. Both the rutile and anatase form of titanium dioxide may be used, however, the rutile form is preferred and includes such products as TiPure® R-960, which is a fine, white powder having a specific gravity of about 3.90 and commercially available from DuPont.

Other commercially available non-black mineral fillers that may be employed to practice this invention include; talc (magnesium silicate) and mica (mixtures of sodium and potassium aluminum silicate).

Other fillers suitable for use with this invention include carbon black and finely ground coal fines and mixtures thereof.

Carbon black is typically used in an amount of about 40 parts to about 125 phr, and preferably in an amount of about 50 to about 95 phr. Generally, any conventional, carbon black used in compounding rubber based adhesive formulations is suitable for use in the practice of this invention. Preferred carbon blacks include furnace blacks, such as GPF (general-purpose furnace), FEF (fine extrusion furnace) and SRF (semi-reinforcing furnace). Also, small amounts of a reinforcing carbon black, i.e., HAF (high-abrasion furnace) may have utility in this invention.

Ground coal in the form of a dry, finely divided black powder which is derived from a low volatile, bituminous coal can be used in preparing the sulfur cured EPDM roof sheeting of this invention. Such ground coal has a particle size ranging from a minimum of 0.26 microns to a maximum of 2.55 microns, with an average particle size of 0.69±0.46 micron as determined by measuring the dimensions of 50 particles, using Transmission Electron Microscopy (TEM). Ground coal produces an aqueous slurry having a pH of about 7.0 when tested in accordance with ASTM D-1512. A preferred finely ground coal, designated "Austin Black® 325", has a specific gravity of 1.22±0.03, an ash content of 4.58 percent by weight, and a sulfur content of 0.65 percent by weight. "Austin Black® 325" is commercially available from Coal Fillers, Incorporated, P.O. Box 1063, Bluefield, Va. Such finely ground coal can be used in amounts ranging from about 5 to about 35 phr, with about 10 to about 25 phr being preferred.

With respect to the processing material, it is included to improve the processing behavior of the composition (i.e. reduce mixing time, enhance pigment incorporation, and increase the rate of sheet forming). The processing oil is included in an amount ranging from about 20 parts to about 100 parts process oil per 100 parts EPDM, preferably in an amount ranging from about 40 parts to about 75 phr. A preferred processing oil is a paraffinic oil, e.g. Sunpar® 2280 which is commercially available from the Sun Oil Company. Other petroleum derived oils including naphthenic process oils may be used.

The polymeric components of this invention preferably consist primarily or exclusively of EPM, EPDM or the aforementioned similar olefinic type copolymers. However, small amounts of other rubber components, suitable as tackifiers, processing aids, softeners, etc., such as natural rubber, depolymerized natural rubber, styrene-butadiene rubbers, polybutadiene and polyisoprene rubbers, butyl and halobutyl rubbers, copolymers of ethylene with propylene, butene, and octene and the like, can be used in amounts which do not adversely affect the physical properties of the composition. The polymeric components utilized in preparing the sulfur cured EPDM roof sheeting of this invention are typically comprised of at least 90 percent EPM and/or EPDM rubber, and more preferably 95 to 100 percent by weight EPM and/or EPDM rubber.

Curing of the EPDM rubbers when used in the compositions of the invention can be effected by any of the well known curing systems, including sulfur and sulfur-donor cure systems, peroxide cure systems, and quinone-type cure systems. Curing of the EPM rubbers, when used in the compositions of this invention, can generally be effected with a sulfur or peroxide cure system.

Sulfur and sulfur-containing cure systems which can be used in the practice of this invention include those containing elemental sulfur along with any of the commonly used sulfur accelerators including; n-cyclohexyl-2-benzothiazole sulfenamide, 2-mercaptobenzothiazole, 2,2'-dibenzothiazyl disulfide, tetramethylthiuram disulfide, zinc dimethyldithiocarbamate, zinc dibutyldithiocarbamate, 4,4' dithiodimorpholine, dipentamethylenethiuram hexasulfide, tetramethylthiuram monosulfide, ferric dimethyldithiocarbamate, zinc-o,o-dibutylphosphorodithioate, zinc diethyldithiocarbamate, and the like.

Sulfur donor-type accelerators may be used in place of elemental sulfur or in conjunction with elemental sulfur if desired. Suitable amounts of sulfur and/or sulfur donor-type compounds can be readily determined by those of ordinary skill in the art and generally range from about 1 to about 3 phr. The amounts of sulfur vulcanization accelerator can also be readily determined by those of ordinary skill in the art and generally range from about 2 to about 6 phr.

Examples of suitable peroxides that can be used as curing agents or co-curing agents include alpha-cumyl hydroperoxide, methylethylketone peroxide, hydrogen peroxide, acetylacetone peroxide, t-butyl hydroperoxide, t-butyl peroxybenzoate, 2,5-bis(t-butyl peroxy)-2,5-dimethylhexene, lauryl peroxide, benzoyl peroxide, 2,4-dichlorobenzoyl peroxide, dibenzoyl peroxide, bis(p-monomethylene-benzoyl) peroxide, bis(p-nitrobenzoyl) peroxide, phenylacetyl peroxide, and the like. Suitable amounts of peroxide crosslinking agents can be readily determined by those having ordinary skill in the art and generally range from about 1 to about 6 phr.

Examples of inorganic peroxides which can be used as co-curing agents with p-quinone dioxime include lead peroxide, zinc peroxide, barium peroxide, copper peroxide, potassium peroxide, silver peroxide, sodium peroxide, calcium peroxide, metallic peroxyborates, peroxychromates, peroxydicarbonates, peroxydiphosphates, peroxydisulfates, peroxygermanates, peroxymolybdates, peroxynitrates, magnesium peroxide, sodium pyrophosphate peroxide, and the like.

Examples of polysulfide activators for the quinone-type co-curing agents include calcium polysulfide, sodium polysulfide, as well as organic polysulfides having the general formula R—(S)$_x$—R, wherein R is a hydrocarbon group and x is a number from 2—4. Examples of organic polysulfides are disclosed in U.S. Pat. No. 2,619,481.

Conventional radiation equipment and techniques can be employed in the practice of this invention. Suitable ionizing crosslinking promoters which can be used include: liquid high-vinyl 1,2-polybutadiene resins containing 90% 1,2-vinyl content; Sartomer SR-206 (ethylene glycol dimethacrylate); Di-Cup R (dicumyl peroxide, about 98% active); and Pental A (pentaerythritol resin prepared from tall oil). Preferably, these rubber chemical additives can be included in an amount of from about 1.5 to about 20 phr. Such rubber chemical additives should be compatible with the other ingredients in the composition and function to reduce the dosage of ionizing radiation needed to obtain the desired level of crosslinking.

The compositions of this invention can be prepared by conventional means using conventional rubber compounding equipment such as a Brabender, Banbury, Sigmablade mixer, two-roll mill, or other mixers suitable for forming viscous, relatively uniform admixtures. Mixing techniques depend on a variety of factors such as the specific types of polymers used, and the fillers, processing oils, waxes and other ingredients used. The ingredients can be added together in a single shot, loaded with the fillers, oils, etc. going in first and the rubber going in last, or in a more conventional manner with the rubber added first, depending on the actual ingredients used. Mixing cycles generally range from about 3 to 6 minutes. Better mixing is generally attained by an incremental procedure in which the rubber and part of the fillers are added first with little or no oil, with the remaining fillers and oil being added in additional increments. Rapid mixing and good dispersion can also be achieved by adding part of the EPM or EPDM on top of the fillers, plasticizers, etc. This procedure can be further modified by withholding part of the oil which is then added incrementally. The cure package (sulfur/accelerated) is typically added near the end of the mixing cycle and at lower temperatures to prevent premature curing of the EPM or EPDM composition. When utilizing a type B Banbury internal mixer, in a preferred mode, the dry or powdery materials such as the non-black mineral fillers (alumina trihydrate, colemanite) of the present invention are added first, followed by the liquid process oil and finally the polymer (this type of mixing can be referred to as an upside-down mixing technique). Two-stage mixing can be employed when better filler dispersion is desired. The rubbery composition can then be formed into a sheet via calendering. The compositions of the invention can also be formed into various types of articles using other techniques such as extrusion.

The resulting admixture is sheeted to a thickness ranging from 5 to 200 mils, preferably from 35 to 60 mils, by conventional sheeting methods, for example, milling, calendering or extrusion. Preferably, the admixture is sheeted to at least 40 gauge (0.040 inches) which is the minimum thickness specified in manufacturing standards set by the Roofing Council of the Rubber Manufacturers Association for non-reinforced EPDM rubber sheets for use in roofing applications. In many cases, the admixture is sheeted to 40–45 gauge thickness since this is the thickness for a large percentage of "singleply" roofing membranes used commercially. The sheeting can be visually inspected and cut to the desired length and width dimensions after curing.

The compositions of this invention can be compounded with various conventional additives as desired, including carbon blacks, clays, silicas, silicates and other fillers; process and extender oils; processing aids such as zinc stearate, sodium dodecyl sulfate and the like; tackifying resins, plasticizers, antioxidants, antiozonants, waxes, cure accelerators, zinc oxide, stearic acid, UV stabilizers and the like. Such additives can be utilized in amounts conventionally employed in such compounds.

A better understanding of the detailed aspects and advantages of this invention can be had by reference to the following non-limiting, illustrative examples.

EXAMPLE 1

A control EPDM composition free of the green strength promoters of this invention was prepared along with three EPDM compositions containing the green strength promoters of this invention. The compositions were prepared in accordance with the formulas set forth in Table 1. All of the EPDM compositions were similarly mixed and compounded in two stages for a total of about 3.5 to 6 minutes. None of the EPDM compositions exhibited any filler dispersion problems.

Each of the four compositions (the control EPDM composition, and EPDM compositions A, B and C in accordance with this invention) were calendered to a thickness of 60 mils and cut into a plurality of test specimens. The size of each test specimen was 0.5 inch (width) by four inches in length (test in duplicate or triplicate). The initial Instron jaw separation was two inches. Each test specimen was tested using a crosshead speed of 20 inches per minute on a table model 4301 Instron Universal Tester. The Universal Tester (a testing machine of the constant rate-of-jaw separation type) is equipped with suitable grips capable of clamping the specimens, without slippage.

EXAMPLE 2

Similar green strength tests were preformed at 23° C. on specimens taken from both the machine and cross directions. The results, shown in Table II, again demonstrate that significant improvements in green strength are achieved with the invention.

EXAMPLE 3

The peak green strength of test specimens for each of the EPDM compositions were determined at 50° C. in the machine direction. The results, shown in Table III, demonstrate that dramatic improvements in green strength are achieved by utilizing the green strength promoters of this invention.

TABLE I

EVALUATION OF ALUMINA TRIHYDRATE, COLEMANITE AND MIXTURES THEREOF IN EPDM COMPOSITIONS

| COMPOUND IDENTIFICATION | CONTROL | A | B | C |
| --- | --- | --- | --- | --- |
| EPDM | 100 | 100 | 100 | 100 |
| N650 HiStr GPF black | 138.5 | 70 | 75 | 75 |
| Sunpar ® 2280 process oil[a] | 95 | 68 | 65 | 65 |
| Alumina trihydrate (H-15)[b] | — | 80 | — | 80 |
| Colemanite ®[c] | — | — | 75 | 30 |
| HiWhite R ® Clay[d] | — | 42 | — | — |
| Zinc oxide | 2.5 | 3 | 3 | 3 |
| Stearic acid | 1 | 1 | 1 | 1 |
| Rubber curing ingredients | 4.0 | 4.12 | 4.05 | 4.15 |
| Total | 341.0 | 368.12 | 323.05 | 358.15 |

Description of the above Ingredients
[a]Sunpar ® 2280 process oil - paraffinic process oil, ASTM D2226, type 104B having a specific gravity of 0.892 at 15° C.
[b]Alumina trihydrate (ATH) - a finely divided, odorless, crystalline, white powder having the chemical formula $Al_2O_3 \cdot 3H_2O$ and specific gravity of about 2.42 and an ash content of about 64–65 weight percent.
[c]Colemanite - an odorless, crystalline powder having the chemical formula $Ca_2B_6O_{11} \cdot 5H_2O$ and specific gravity of 2.40.
[d]HiWhite R ® Clay - an odorless, airfloated soft clay having a specific gravity of about 2.60.

TABLE II

GREEN STRENGTH AT 23° C.*

| Compound Identification | Thickness (mils) | Peak Green Strength Machine Direction (psi) | Peak Green Strength Cross Direction (psi) | Remarks |
| --- | --- | --- | --- | --- |
| Control** | 61 | 167 | 140 | EPDM control |
|  | 61 | 166 | 143 |  |
| A | 57 | 299 | 242 | EPDM membrane |
|  | 58 | 328 | 238 | (ATH only) |
| B | 59 | 268 | 253 | EPDM membrane |
|  | 59 | 310 | 239 | (Colemanite only) |
| C | 59 | 281 | 229 | EPDM membrane |
|  | 61 | 305 | 230 | (ATH + Cole- |

TABLE II-continued

GREEN STRENGTH AT 23° C.*

| Compound Identification | Thickness (mils) | Peak Green Strength | | Remarks |
|---|---|---|---|---|
| | | Machine Direction (psi) | Cross Direction (psi) | |
| | | | | manite) |

*Uncured calendered 60 mil sheets were allowed to equilibrate at room temperature for about two hours prior to testing.
**EPDM Control: 100 EPDM, 138.5 PHR N-650 HiStr GPF black, 95 PHR Sunpar ® 2280 process oil, 2.5 PHR zinc oxide, 1 PHR stearic acid, and 4.0 PHR rubber curing ingredients.

TABLE III

GREEN STRENGTH AT 50° C.*

| Compound Identification | Thickness (mils) | Peak Green Strength (machine direction) (psi) | Remarks |
|---|---|---|---|
| Control** | 60 | 28 | EPDM Control |
| | 61 | 30 | |
| A | 58 | 60 | EPDM membrane |
| | 58 | 52 | (ATH only) |
| B | 59 | 89 | EPDM membrane |
| | 59 | 89 | (Colemanite only) |
| C | 60 | 58 | EPDM membrane |
| | 61 | 59 | (ATH + Colemanite) |

*Uncured calendered 60 mil sheets were allowed to equilibrate at room temperature for about two hours before placing the test specimens in the Instron oven. The test specimens were heated at 50° C. for 15 minutes prior to testing.

EXAMPLE 4

A number of other cured physical properties including modulus, tensile, tear properties, and hardness were tested for each of the EPDM compositions. The results, which are shown in Table IV, indicate that various cured physical properties (especially those important for rubber roof sheet materials) are not adversely affected by the green strength promoters of this invention.

TABLE IV

EVALUATION OF ALUMINA TRIHYDRATE, COLEMANITE AND MIXTURES THEREOF IN EPDM COMPOSITIONS

| Compound Identification | Control | A | B | C |
|---|---|---|---|---|
| Stress-Strain Properties at 23° C. - Unaged | | | | |
| Autoclave cured membrane | | | | |
| 100% Modulus, psi | 310 | 325 | 265 | 280 |
| 300% Modulus, psi | 980 | 765 | 750 | 790 |
| Tensile at break, psi | 1485 | 1545 | 1415 | 1355 |
| Elongation at break % | 475 | 615 | 550 | 535 |
| Die C Tear Properties at 23° C. - Unaged | | | | |
| Machine Direction - Autoclave cured membrane Lbs./inch | 207 | 176 | 176 | 174 |
| Die C Tear Properties at 23° C. - Unaged | | | | |
| Cross Direction - Autoclave cured membrane Lbs./inch | 196 | 165 | 163 | 156 |
| Trouser Tear at 23° C. - Unaged | | | | |
| Machine Direction - Autoclave cured membrane Lbs./inch | 123 | 117 | 113 | 109 |
| Trouser Tear at 23° C. - Unaged | | | | |
| Cross Direction - Autoclave cured membrane Lbs./inch | 134 | 105 | 126 | 103 |
| Shore "A" Hardness - Stacked pieces | | | | |
| Unaged-Tested at 23° C. | 65 | 64 | 64 | 65 |

While in accordance with the patent statutes the best mode and preferred embodiment has been set forth, the scope of the invention is not limited thereto, but rather by the scope of the attached claims.

What is claimed is:

1. A rubber composition comprising an EPM copolymer, an EPDM terpolymer or a mixture thereof, and an amount of colemanite which is effective to increase the green strength of said rubber composition.

2. A rubber composition in accordance with claim 1, wherein the total amount of said colemanite is in the range from about 10 to about 150 parts by weight per 100 parts by weight of said EPDM and/or said EPM.

3. A rubber composition in accordance with claim 2, which has a green strength of at least about 50 psi in the machine direction at 50° C.

4. A roof sheeting composition comprising:
   (a) 100 parts by weight of a vulcanizable elastomer selected from the group consisting of EPDM terpolymer, EPM copolymer, butyl rubber, polychloroprene, chlorosulfonated polyethylene, chlorinated polyethylene, and combinations thereof;
   (b) from about 10 parts to about 150 parts by weight of colemanite having an average particle size of from about 0.1 to about 5 microns; and
   (c) from about 1 to about 6.0 parts by weight of rubber curing ingredients.

5. The composition of claim 4 wherein said colemanite has an ash content of 70–71% by weight, a specific gravity of about 2.40.

6. The composition of claim 4 wherein said composition contains from about 10 to about 125 parts of colemanite.

7. The composition of claim 4 further comprising from about 60 to about 125 parts by weight of carbon black.

8. The composition of claim 4 wherein said vulcanizable elastomer is EPDM terpolymer, EPM copolymer or a combination thereof.

9. The composition of claim 8 wherein said curing ingredients are selected from the group consisting of sulfur, sulfur donor accelerators and mixtures thereof.

10. The composition of claim 9 wherein said sulfur donor is selected from the group consisting of thiuram polysulfides, salts of dialkyldithiocarbamates, and mixtures thereof.

11. The composition of claim 9 further comprising one or more vulcanizing accelerators.

12. The composition of claim 11 wherein said vulcanizing accelerator is selected from the group consisting of thioureas; thiuram monosulfides; benzothiazole sulfenamides; 2-mercaptoimidazoline; N, N' diphenyl guanidine; N, N'-di (2-methylphenyl) guanidine; 2-mercaptobenzothiazole, zinc 2-mercaptobenzothiazole and 2-(morpholinodithio)-benzothiazole disulfide.

13. The composition of claim 4 further comprising processing oils, plasticizer, processing aids, antioxidants, UV stabilizers and tackifying resins.

14. The composition of claim 4 further comprising fillers selected from the group consisting of carbon black, coal filler, silicas, silicates, titanium dioxide, mica, talc and calcium carbonate.

* * * * *